United States Patent [19]

Biser et al.

[11] Patent Number: 4,550,320

[45] Date of Patent: Oct. 29, 1985

[54] CARRIAGE-MOUNTED VELOCITY MULTI-DEFLECTION COMPENSATION FOR BI-DIRECTIONAL INK JET PRINTERS

[75] Inventors: Roger W. Biser; Joseph E. Mishark, both of Rochester, Mich.

[73] Assignee: Centronics Data Computer Corp., Hudson, N.H.

[21] Appl. No.: 547,426

[22] Filed: Oct. 31, 1983

[51] Int. Cl.[4] .............................................. G01D 15/18

[52] U.S. Cl. ........................................ 346/75; 400/126

[58] Field of Search ............. 346/75, 140 R; 400/126, 400/323

[56] References Cited

U.S. PATENT DOCUMENTS

| | | | |
|---|---|---|---|
| 4,075,636 | 2/1978 | Galetto et al. | 346/75 |
| 4,138,688 | 2/1979 | Heard et al. | 346/75 |
| 4,190,845 | 2/1980 | Cooper et al. | 346/75 |
| 4,219,823 | 8/1980 | Fathergill et al. | 346/75 |
| 4,246,589 | 1/1981 | Denny et al. | 346/75 |
| 4,321,609 | 3/1982 | Fidler et al. | 346/75 |
| 4,345,260 | 8/1982 | Deproux | 346/75 |
| 4,345,263 | 8/1982 | Tazani et al. | 346/140 R |
| 4,349,828 | 9/1982 | Fischbeck et al. | 346/1.1 |
| 4,364,057 | 12/1982 | Ebi et al. | 346/75 |

*Primary Examiner*—E. A. Goldberg
*Assistant Examiner*—Gerald E. Preston
*Attorney, Agent, or Firm*—Henry D. Pahl, Jr.

[57] ABSTRACT

A recording or printing device which will print bidirectionally in both the left to right and right to left directions by use of an ink jet head travelling horizontally with respect to a printing medium. A carriage carries the ink jet head and an image is formed by ink droplets from the ink jet head. To compensate for relative horizontal displacement of the ink droplets caused by the horizontal travel of the head and carriage, tilting compensating structure is provided for parallel electrostatic deflection plates. The deflection plates are mounted on a pivotable structure upon the traverse carriage and because of the bias effect of a pair of springs and a slide block will tilt in the correct direction to provide the needed compensation of the ink droplets. Mechanical limit stops on a slide bar determine the amount of tilt for more than one speed of carriage traverse, and changeable limit stop structure permits the limit stops to be changed for a second, a third or more speed of carriage movement.

20 Claims, 9 Drawing Figures

CARRIAGE-MOUNTED VELOCITY MULTI-DEFLECTION COMPENSATION FOR BI-DIRECTIONAL INK JET PRINTERS

BACKGROUND OF THE INVENTION

1. Field of the Invention

This invention relates generally to a recording or printing device utilizing a jet of liquid ink droplets to form a printed image which droplets are selectively charged as they move toward the paper or other medium for receiving the droplets.

2. Description of the Prior Art

Ink jet type printing devices are well known wherein a stream of ink droplets emerge from a nozzle print head as a jet of ink, and then the droplets are suitably charged so they may be deflected by horizontal deflection plates during their travel toward the paper for receiving them in the desired configuration. Thus, the ink droplets upon impinging on the paper surface will form sets of dots which represent letters, numbers, or desired symbols.

Since the amount of charge on each ink drop is controlled individually, a drop can be deflected by a desired amount in a vertical direction. As the drops are deflected vertically, the printhead is moved horizontally at a constant speed. The droplets which are not required in forming a particular character are left uncharged and are undeflected. These droplets are intercepted by a gutter and are recycled to an ink reservoir.

Since the droplets are ejected serially from a moving source, it is obvious that each succeeding droplet will have moved some finite distance in the direction of motion relative to the preceding droplet. The amount of displacement is proportional to the printhead velocity and the frequency with which the droplets are ejected.

In printing a character, the droplets are deflected from bottom-to-top during a scan so that by the time the top most droplets reach the printing surface, the dots they produce have been displaced horizontally relative to the bottom dots previously printed. Unless some compensation is performed, the dots printed during each scan would "lean" in the direction of printhead motion. Furthermore, in the case of bidirectional printing, the characters would "lean" in alternate directions depending upon the direction of motion of the printhead when the character was formed, thus producing unacceptable print quality.

One previous method of overcoming this problem was to incline fixed deflection plates at a fixed angle, determined by the scan repetition rate and velocity of the printhead carriage, and print in only one direction. This, of course, limited the printer to one speed and undirectional printing only.

However, to accomplish bidirectional printing using a fixed deflection plate angle, the characters could be scanned from bottom-to-top when the printhead moved in one direction; and scanned from top-to-bottom when the printhead moved in the opposite direction. This provides bidirectional printing at one speed, but requires a dual scanning mode and doubles the memory space required for dual compensation storage. For example, see U.S. Pat. No. 4,075,636 and U.S. Pat No. 4,321,609.

The problem noted above can be partially solved by mechanically changing the deflection plate angle to automatically compensate for horizontal motion of the printhead regardless of the direction of printing or speed. This allows the development of a more versatile printer having the capability of printing bidirectionally.

Several known devices provide structure for partially solving the above problems. For example, U.S. Pat. No. 4,219,823 to Fathergill et al, mounts deflection electrodes 14, 15 upon a ring assembly 21 which is rotatable by electric solenoids so that the deflection electrodes will be tilted in one direction or the other. Another known prior art device to Denney et al, U.S. Pat. No. 4,246,589, mounts deflection electrodes 14, 15 upon a rocker member 22 which will tilt the deflection electrodes in one direction or the other to compensate for the skewing of the ink jet droplets as the carriage moves laterally of the print medium 16. While both of the devices of these patents will compensate for ink jet skewing for a particular speed of carriage traverse, neither provides for different speeds of carriage traverse by arranging for different degrees of tilt of the deflection electrodes to correspond to the different traverse speeds.

However, none of the known prior art devices offer the new and novel features of the present invention.

SUMMARY OF THE INVENTION

An object of the present invention is to provide an electrostatic ink jet printer which can eliminate the slanting or skewing effect caused by lateral movement at several speeds of the jet head relative to the print receiving medium.

Another object of the present invention is to provide a pivotable tilt mechanism for the electrically charged deflection electrodes or plates as used with an ink jet printer which will compensate for the skewing effect caused by lateral movement of the ink jet head. The tilt mechanism will work in both directions of head movement so that bidirectional printing can be effected without distortion, and a changeable limit stop structure provides compensation for at least two speeds of lateral head movement.

The present invention has a number of new and novel features. Among these are the mechanical mounting of deflection electrodes (plates) which will compensate bidirectionally for the undesired skewing affect of ink jet droplets due to carriage movement as a line being printed is traversed. Without some compensating structure, in conventional type ink jet printers, the line of dots being printed is inclined at an angle with respect to the vertical as the multi-nozzle ink jet printhead moves horizontally along the line being printed. However, in the device of the present invention the deflection plates or electrodes for effecting movement of the ink droplets are appropriately tilted according to the direction of head movement to compensate for the undesired skewing effect.

Upper and lower deflection plates are mounted in proper relationship to each other in an assembly mounted to tilt in either direction about a V-shaped pivot point centrally located below the deflection plates. The deflection plate assembly is mounted on a traverse carriage having a mating pivot support; the carriage being supported by a pair of horizontal support shafts or guide rails so that the carriage is free to move horizontally in either direction. The carriage is guided by rollers or slideable bearings on the support shafts. In sliding contact with one of the support shafts directly below the tilting deflection plate assembly on the carriage is a slide block. Affixed to the slide block is a long pin to the two ends of which are attached an end of each of a pair of tension springs extending upward to the two ends of a corresponding pin on the tilting deflection plate assembly. The slide block is located between two downward extensions on the carriage which allow a limited amount of motion of the slide block relative to the carriage. When the traverse carriage is driven by external means, such as a servo motor and cable drive system, the slide block is urged in the direction of motion of the carriage by one of the two extensions of the carriage. The position of the slide block is purposely offset from the vertical centerline of the deflection plate pivot so that the tension springs are biased to hold the deflection plate assembly in a tilted position, the angle of which is determined by stop pads thereon which engage mating contact points (slots) on the carriage.

Whenever the carriage is driven in the opposite direction, the friction of the slide block on the support shaft is sufficient to prevent motion thereof until the other extension of the carriage is brought into contact with the slide block at which time the slide block is carried along with the carriage throughout its travel and at the same velocity. During the turnaround period, the lost motion of the slide block is such that the force of the tension springs goes "across center" and the deflection plate assembly is urged to pivot to a stable position which is equal but in the opposite direction to its previous position.

The configuration is such that when the traverse carriage is moving left to right, the left hand carriage extension is in contact with the slide block and the force of the pair of tension springs holds the deflection plate assembly so that a line perpendicular to the plates is counterclockwise from the vertical resulting in a tilt to the left of the deflection plate assembly as shown in FIG. 2. In this position, those ink droplets in a scan which occur later in time (such as the uppermost drops) are deflected further left to compensate for the carriage motion to the right resulting in a vertical printed line.

When the carriage is moving right to left, as shown in FIG. 3, the right hand carriage extension contacts the slide block and the deflection plate assembly is tilted toward the right which compensates for the carriage motion to the left. However, for any one speed of carriage and printhead traverse, there is only one proper degree of tilt of the deflection plate assembly and thus the deflection electrodes. Therefore, in order to properly compensate for different speeds of traverse movement, at least two different limit stops are provided on a slide bar for each tilt direction. While only two such stops are shown for each direction of carriage movement, the present invention encompasses a greater number than two of such stops so that more than two bidirectional speeds of carriage traverse can be provided.

Thus, the invention provides changeable limit stops for the amount of tilt angle so that the tilt compensation may be varied to correlate with printhead velocity. For example, if the carriage and printhead horizontal velocity is doubled, the deflection plate angle is doubled also. Movable stops are provided under the pads at each end of the deflection plate assembly to allow more or less tilt as the tension springs move "across center". Control of these stops may be accomplished manually, by solenoid actuation, by driving the carriage to either side frame and using a slide bar having different heights of pads for the tilt angle desired, or any similar structure for changing the location of the plurality of stops.

These together with other objects and advantages which will become subsequently apparent reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
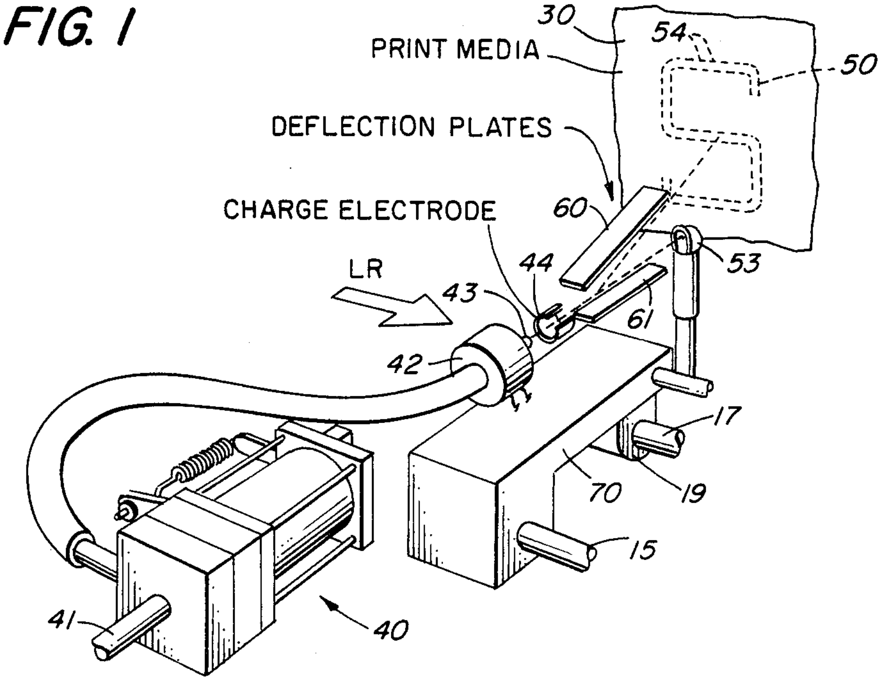
FIG. 1 is a perspective view of an ink jet printing system with which the present invention is used.

FIG. 1 shows a typical ink jet printing system. An ink fluid input 41 supplies ink to a pump system 40. A printhead 42 then discharges from nozzle 43 a continuous stream of ink drops which are selectively charged by a charge electrode 44. The drops are then deflected by deflection plates 60,61 according to their charge to impinge on the recording media 30. The deflection plates 60,61 are maintained at a constant voltage. The printhead, charge electrode and deflection plates are mounted on a traverse carriage 70 for bidirectional lateral movement with respect to the print media. The traverse carriage 70 is slidably mounted on a guide support shaft 15. An ink catcher 53 is provided for the "start-up" and "shut-down" periods.

Using the device to print a vertical line 50 of the letter 54, comprised of a plurality of dots, when the traverse carriage 70 for the printhead is moving from left to right (arrow LR) the carriage will have moved some distance to the right between the first dot printed and the last dot printed. Assuming the dots are printed in an ascending fashion, the line will lean to the right. Moreover, when the traverse carriage reverses direction and moves from right to left the characters will lean to the left. In addition, the slant or skew angle will be a function of the carriage speed. Thus, higher speed printing will effect more of a slant or skew than slower speed printing.

Figure 2:
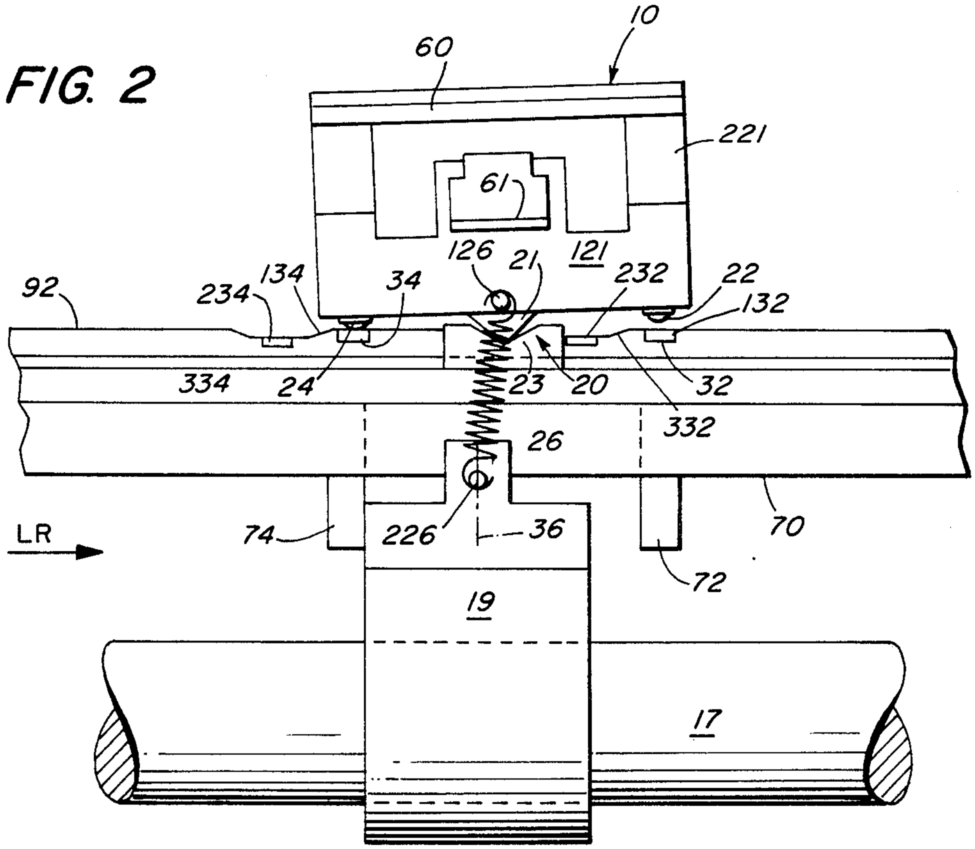
FIG. 2 is an elevational view showing the position of the tilt assembly for the deflection plates as the traverse carriage travels in a left to right direction.
Figure 3:
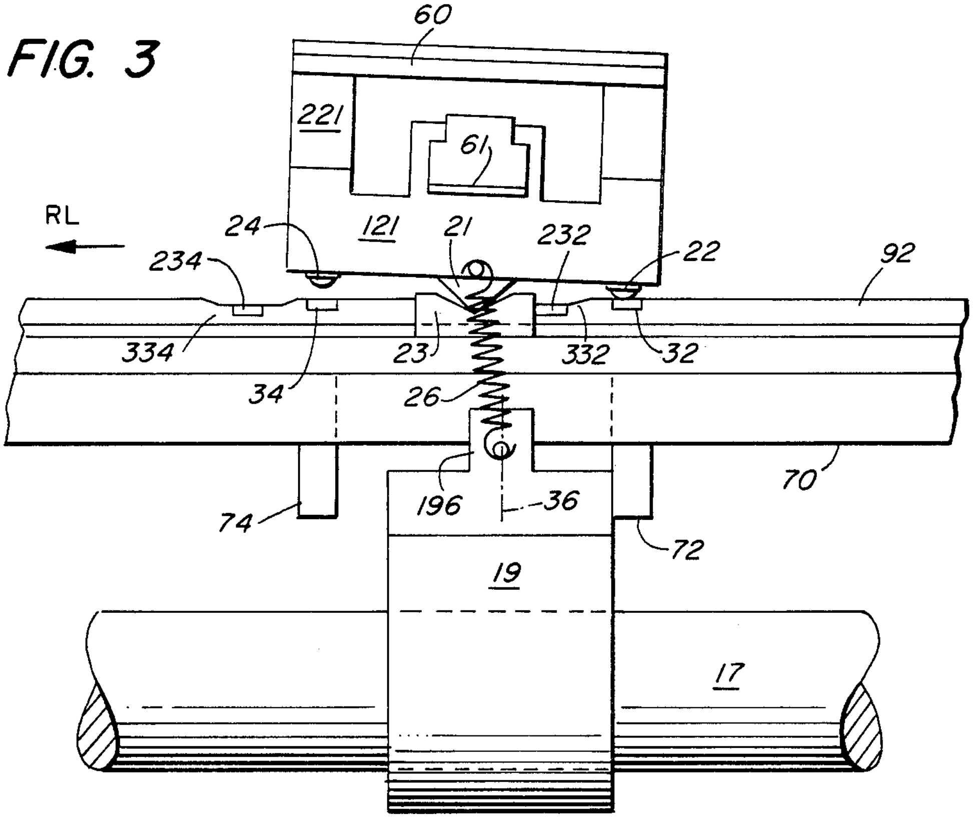
FIG. 3 is a view similar to FIG. 2 showing the tilt assembly for the deflection plates as the traverse carriage travels in the opposite direction, i.e., right to left.

The present invention permits bidirectional printing at multiple speeds without slant. The overall deflection plate tilt assembly of the present invention is shown in FIGS. 2 and 3. In both of these figures, we are looking towards the print receiving medium from the position of the charge electrode 44 of FIG. 1.

The essence of the invention is to remove character slant or skew by tilting the deflection plates counterclockwise when printing left to right (FIG. 2), and clockwise when printing right to left (FIG. 3). In addition, the angle of tilt is varied according to the printing speed. While only two variations of angle tilt are depicted, more are intended to be provided by increasing the number of limit pads provided.

The deflection plate assembly 10 is supported by pivot structure 20. This structure comprises a pair of fine-edged, V-shaped pivot points 21 resting within a complementary but slightly wider V-shaped pivot support 23, mounted on the traverse carriage 70 so that the overall deflection plate assembly 10 can pivot with respect to the traverse carriage. The deflection plate assembly 10 is connected by a pair of tension springs 26 to a slide block 19 (front and back). The slide block 19 is slidably mounted on a guide support shaft 17 parallel to the guide support shaft 15 (FIG. 1). The traverse carrfage 70 has downwardly depending projections or extensions, 72 and 74. The traverse carriage 70 is laterally movable with respect to the guide support shafts 15 and 17, and driven bidirectionally by conventional servo motor and cable drive apparatus (not shown).

When the traverse carriage 70 is moving left to right (FIG. 2), the slide block 19 is contacted by the left carriage extension 74, and the pair of tension springs 26 bias the deflection plate assembly 10 to tilt to the left (counterclockwise). The angle of the tilt is determined (as shown) by the engagement of the left stop 24 with contact pad 34 in the slide bar 92. The angle of the tilt is sufficient to eliminate character slant at the predetermined selected printing speed.

Once the bidirectional traverse carriage reaches the right hand margin, it is reversed in direction, and then moves from right to left (FIG. 3). The extension 72 then engages the slide block 19, and the junction point between elements 21, 23 goes past the center line 36 before extension 72 engages slide block 19 to change the angle of the pair of tension springs 26, thus reversing the tilt to the right (clockwise) of the deflection plates to eliminate character slant or skew in the opposite direction. In this direction of traverse carriage movement the right stop 22 engages a pad 32 to determine the reverse angle of tilt. Thus, bidirectional printing without slant at one predetermined speed of traverse carriage movement is made possibly by the abovedescribed structure.

However, to print at a different speed without slant, a different degree of tilt must be effected. To accomplish this for a higher speed of traverse carriage movement, the slide bar 92 is indexed, to the right in FIG. 2, so that the limit stops 22,24 engage contact pads 232,234 rather than contact pads 32,34. Since contact pads 232,234 are mounted in depressions 332,334, their respective positions are lower, or deeper than contact pads 32 and 34; therefore the angle of tilt of the deflection plates in both directions is increased, and a higher speed of bidirectional printing without slant is made possible. Thus, the device of the present invention achieves multispeed printing capability without print distortion. Of course, by adding additional contact pads at different recessed depths, more than two traverse speeds can be provided with suitable tilt compensation for each of the plurality of speeds being provided.

Figure 4:
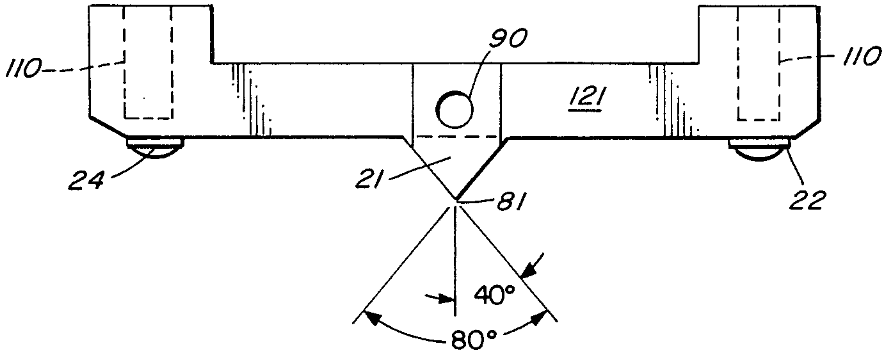
FIG. 4 is a front elevational view of the lower structure for the deflection plate tilt assembly having the pair of V-shaped pivot points thereon.
Figure 5:
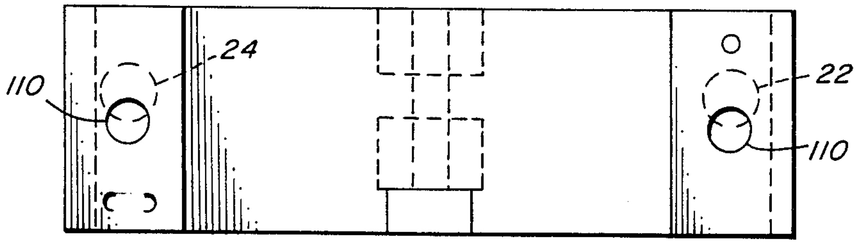
FIG. 5 is a top plan view of the structure of FIG. 4.
Figure 9:
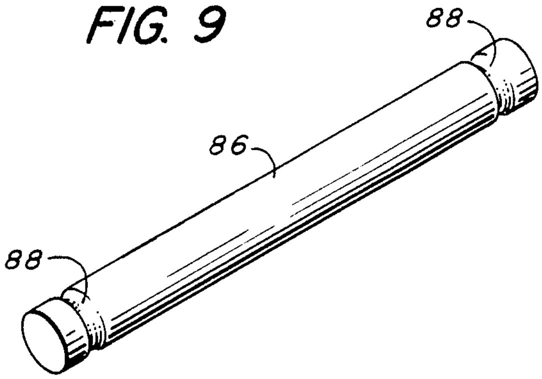
FIG. 9.is a perspective view of a spring retainer pin per se for use in holding the tension springs.

FIGS. 4–9 show more specific details of the lower support structure of the tilt assembly together with the slide bar for the changeable limit stops. In FIG. 4, one of the pair of V-shaped pivot points 21 for the lower support structure 121 for the pair of deflection plates or electrodes is shown. Each side of the V makes approximately a 40 degree angle from a center line vertically through the point thereof. The overall total angle of 80 degrees for the V-shaped point 21 provides a sturdy supporting area; however, still maintaining a relatively sharp edge 81. An aperture 90 in line with the center line and through the middle portion of the lower support structure 121 receives pin 86 therethrough for supporting the upper ends of the pair of bias springs 26. This pin, as shown in the perspective view of FIG. 9, is provided with suitable retaining grooves 88 for the respective upper ends of the pair of bias tension springs 26. The lower ends of the springs 26 are mounted on a similar pin through an aperture 296 in the upper extension 196 of slide block 19. The main central aperture 96 of slide block 19 is slightly larger in diameter than the diameter of guide support shaft 17 upon which it slides.

Figure 6:
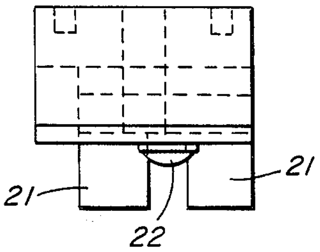
FIG. 6 is an end view of the lower structure for the tilt assembly of FIGS. 4 and 5 showing the spacing between the pair of V-shaped pivot points.

Preferably a pair of V-shaped pivot points 21 are provided for the lower support structure 121, as best seen in the end view of FIG. 6. The purpose of having a pair of pivot points is so the slide bar 92 can pass therebetween, and together with the respective limit stops 22 and 24 which engage with the pads on the slide bar will provide an inherent self-centering function. Suitable apertures 110 are provided for attaching the upper supporting structure 221 for holding the pair of deflection plates 60 and 61 rigid with the lower support structure 121. Preferably butyl rubber is used for the pads 32 and 34. These pads absorb shock as the tilt assembly moves from one limit position to another, decrease noise, and thus increase the overall efficiency of the operation of the device.

Figure 7:
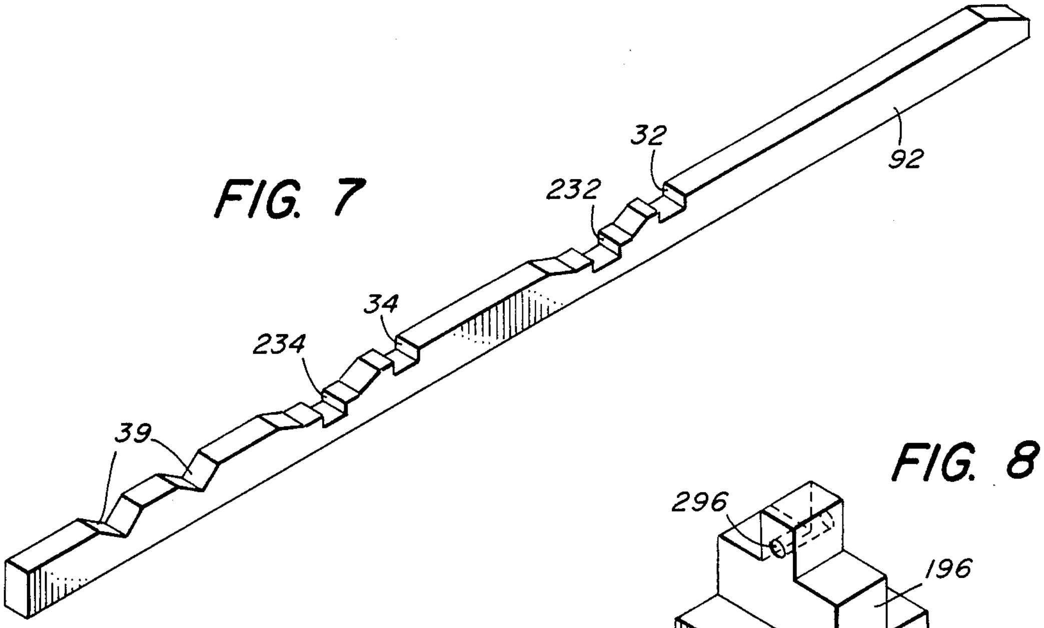
FIG. 7 is a perspective view of the slide bar per se having two pairs of limit stops in the middle portion and two corresponding retention recesses at one end thereof.
Figure 8:
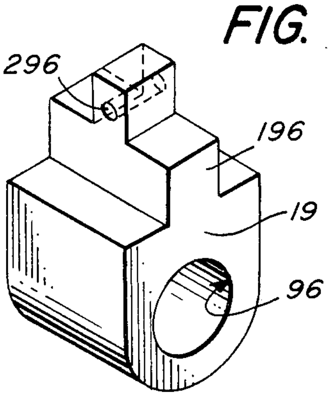
FIG. 8 is a perspective view of the slide block per se.

FIG. 7 shows in greater detail the features of the slide bar 92. The pair of limit pads 32 and 34 are used for one speed of traverse movement while the lower pair of pads 232 and 234 are used for a second speed. Expanded V recesses 39 are shown at one end of slide bar 92 for cooperation with spring biased detent structure (not shown) to resiliently retain slide bar 92 in one of the two limit stop positions. Of course, when three pairs, four pairs, or even more limit stops are provided in addition to the two pairs depicted, suitable additional expanded Vee recesses will be added. Only two pairs of limit stops are shown for clarity of disclosure which in no way is to be considered limiting as to the number of predetermined traverse speeds and tilt angle degrees that can be provided by this invention. Of course, as mentioned above, while as depicted the slide bar is manually controlled, it is envisioned that solenoid actuation thereof, or other mechanical, electrical or motor actuation thereof may be appropriately used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. An ink jet printer comprising:

a nozzle for emitting a stream of ink drops along a predetermined path;

a charging electrode for charging the ink drops;

means for forming an electric field for deflecting ink drops passing thereby;

a print receiving medium for receiving ink drops;

carriage means driven in a bidirectional manner traversely of said print receiving medium and supporting said nozzle, charging electrode, and deflecting means thereon;

pivoted tilt means having a fulcrum coacting with said carriage means and mounted on said carriage means, said tilt means supporting said deflection means so that the deflection means can be mechanically tilted in a manner to compensate for an inclination of ink drop images which would be formed by the drops by movement of said carriage means if not compensated for; and moveable mechanical stop means coperatively associated with said tilt means for providing different tilt compensation for different traverse speeds of said carriage means.

2. An ink jet printer as set forth in claim 1, wherein said tilt means includes pivot structure supporting said deflection means upon said carriage means, tension spring means for biasing said tilt means in one direction of tilt or the other, and said mechanical limit means includes changeable stop structure between said tilt means and said carriage means.

3. An ink jet printer as set forth in claim 2, wherein said mechanical limit means is adjustable to at least two different positions for varying the degree of tilt of said tilt means depending upon the speed of traverse of the carriage means.

4. An ink jet printer as set forth in claim 3, wherein said tension spring means holds the tilt means against one of a plurality of limit stops when the carriage means is traversing in one direction, and then permits the tilt means to change tilt to a mirror image position in the other direction of carriage means movement.

5. An ink jet printer as set forth in claim 4, wherein said plurality of limit stops are provided by a slide bar having a plurality of contact pads therein, with some of said pairs of contact pads being at a different level form others of the contact pads.

6. An ink jet printer as set forth in claim 5, wherein the pivot structure includes a pointed edge mount beneath the tilt means, and the support therefor includes a V-shaped pivot support receiving the pointed edge and mounted upon the bidirectional traversing carriage means.

7. An ink jet printer as set forth in claim 6, wherein said means for forming an electric field includes a pair of deflection plates appropriately spaced and mounted on the pivotable means for deflecting the ink drops passing therebetween according to the direction in which they are tilted.

8. An ink jet printer comprising:

a nozzle for emitting a stream of ink drops at a predetermined velocity in a predetermined path;

a charging electrode for charging ink drops in accordance with signals to be recorded;

first and second spaced apart deflection electrodes on opposite sides of the stream of ink drops;

power supply means for forming an electric field between said deflection electrodes for deflecting ink drops passing between said electrodes;

print receiving means for receiving the deflected ink drops;

means mounting said deflection electrodes for tilting between limited clockwise and counterclockwise positions;

carriage means supporting said nozzle, at least one charging electrode and over-the-center spring biased tilting means mounting the deflection electrodes, said carriage means being bidirectionally driven traversely to said print receiving means; and a number of pairs of moveable stop means cooperating with said tilting means for selectively changing the limited degree of tilt of said tilting means bidirectionally corresponding to the direction and speed of traverse movement of said carriage means from a selection of several different speeds for the purpose of compensating for ink drops on the print receiving means being slanted as would be caused but for the compensation effect of said tilting means.

9. An ink jet printer as set forth in claim 8, wherein a central axis between the pair of electrodes on the tilting means is substantially in alignment with said nozzle and charge electrode.

10. An ink jet printer as set forth in claim 9, wherein said tilting means includes supporting structure for said deflection plates having a sharp edged pivot member integral therewith, said carriage means having a supporting recess for pivotally supporting said sharp edged pivot member therein, and bias means for temporarily maintaining the tilt means in the clockwise position or the counterclockwise position.

11. An ink jet printer as set forth in claim 10, wherein said changeable stop means includes a plurality of limit stop positions for varying the degrees of tilt of said tilting means, said changeable stop means being movably mounted on said bidirectional carriage.

12. An ink jet printer as set forth in claim 11, wherein said changeable stop means comprises a slide bar having a plurality of paired limit pads therein, and at least two position holding recesses in said slide bar.

13. An ink jet printer as set forth in claim 12, wherein said carriage means is mounted upon a guide shaft of the ink jet printer, at least one other guide shaft being provided with said printer, a slide block slidably mounted on said other guide shaft, and said carriage means being provided with two extensions for engagement with said slide block depending upon the direction of movement of said carriage means.

14. An ink jet printer as set forth in claim 23, wherein said bias means includes a pin in said slide block, said pin having a groove at each end thereof, one end of each of a pair of springs engaged in a pin groove on opposite sides of said slide block and the other end of each of said pair of springs attached to a similar pin in the carriage means.

15. An ink jet printer as set forth in claim 14, wherein the center line between the axis of the pin of the slide block and the axis of the pin of the carriage means is such that the pair of bias springs provide an over-center action depending upon the direction of travel of the carriage means during its bidirectional traverse across the print receiving means so that the bias springs through the over-center movement thereof will effect the desired tilt of the tilting means for the deflection electrodes.

16. An ink jet printer as set forth in claim 8, wherein said carriage means is mounted upon a guide shaft of the ink jet printer, at least one other guide shaft being provided with said printer, a slide block slidably mounted on said other guide shaft, and said carriage means being provided with two extensions for engagement with said slide block depending upon the direction of movement of said carriage means.

17. An ink jet printer as set forth in claim 16, wherein said bias means includes a pin in said slide block, said pin having a groove at each end thereof, one end of each of a pair of springs engaged in a pin groove on opposite sides of said slide block, the other end of each of said pair of springs attached to a similar pin in the carriage means, the center line between the pin in the slide block and the pin of the carriage means is such that the pair of bias springs provide an over-center action depending upon the direction of travel of the carriage means during its bidirectional traverse across the print receiving means so that the bias springs through the over-center movement thereof will effect the desired tilt of the tilting means for the deflection electrodes.

18. An ink jet printer as set forth in claim 8, wherein said tilting means includes supporting structure for said deflection plates, a sharp edged pivot member integral with the supporting structure, said carriage means having a supporting recess for pivotally supporting said sharp edged pivot member therein, and bias means for temporarily maintaining the tilt means in a first position or a second position.

19. An ink jet printer as set forth in claim 10, wherein said changeable stop means includes a plurality of limit stop positions for varying the amount of tilt of said tilting means.

20. An ink jet printer as set forth in claim 19, wherein said changeable stop means includes a slide bar having a plurality of paired limit pads therein and at least two position holding recesses in said slide bar, said slide bar being mounted for adjustable, slidable movement on said carriage means.

* * * * *